US010817217B2

(12) United States Patent
Williams et al.

(10) Patent No.: US 10,817,217 B2
(45) Date of Patent: Oct. 27, 2020

(54) DATA STORAGE SYSTEM WITH IMPROVED TIME-TO-READY

(71) Applicant: Seagate Technology LLC, Cupertino, CA (US)

(72) Inventors: Steven S. Williams, Longmont, CO (US); David W. Claude, Loveland, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/021,751

(22) Filed: Jun. 28, 2018

(65) Prior Publication Data

US 2020/0004455 A1 Jan. 2, 2020

(51) Int. Cl.
G06F 3/06 (2006.01)

(52) U.S. Cl.
CPC .......... G06F 3/0659 (2013.01); G06F 3/0604 (2013.01); G06F 3/0679 (2013.01)

(58) Field of Classification Search
None
See application file for complete search history.

(56) References Cited

U.S. PATENT DOCUMENTS

| 6,574,676 | B1 | 6/2003 | Megiddo | |
| 6,757,897 | B1 | 6/2004 | Shi et al. | |
| 6,820,263 | B1 | 11/2004 | Klappholz | |
| 7,043,567 | B2 | 5/2006 | Trentham | |
| 8,171,242 | B2 | 5/2012 | Hong | |
| 9,846,642 | B2 | 12/2017 | Choi et al. | |
| 2015/0022918 | A1* | 1/2015 | Qiang | G11B 20/10 360/55 |
| 2016/0110292 | A1* | 4/2016 | Choi | G06F 16/00 711/103 |
| 2016/0162186 | A1* | 6/2016 | Kashyap | G06F 3/061 711/103 |
| 2018/0373450 | A1* | 12/2018 | Ji | G06F 3/0623 |

FOREIGN PATENT DOCUMENTS

JP  2011170643 A  * 9/2011

* cited by examiner

Primary Examiner — Charles Rones
Assistant Examiner — Jonah C Krieger
(74) Attorney, Agent, or Firm — Hall Estill Attorneys at Law

(57) ABSTRACT

A data storage system can divide a semiconductor memory into a plurality of die sets prior to populating a die set queue with data access commands addressed by a remote host and having a first order. A command order strategy generated by a time-to-ready module organizes the data access commands to a second order that populate a channel queue and are executed as directed by the time-to-ready module in the second order.

20 Claims, 7 Drawing Sheets

DATA STORAGE SYSTEM WITH IMPROVED TIME-TO-READY

SUMMARY

Various embodiments of the present disclosure are generally directed to the management of data access operations to a memory, such as, but not limited to, a flash memory in a solid state drive (SSD).

In accordance with some embodiments, a data storage system divides a semiconductor memory into a plurality of die sets prior to populating a die set queue with data access commands addressed by a remote host and having a first order. A command order strategy generated by a time-to-ready module organizes the data access commands to a second order that populate a channel queue and are executed as directed by the time-to-ready module in the second order.

A data storage system, in various embodiments, divides a semiconductor memory into a plurality of die sets prior to populating a die set queue with data access commands addressed by a remote host and having a first order. An electrical power interruption is experienced that disrupts operation of at least one die set of the plurality of die sets. A command order strategy generated by a time-to-ready module organizes the data access commands to a second order that populate a channel queue and are executed as directed by the time-to-ready module in the second order.

Other embodiments configure a data storage system as a semiconductor memory divided into a plurality of die sets with at least one die set queue populated with data access commands addressed by a remote host and having a first order. A command order strategy generated by a time-to-ready module organizes the data access commands to a second order that populates a channel queue and subsequently executes the data access commands in the second order.

These and other features which may characterize various embodiments can be understood in view of the following detailed discussion and the accompanying drawings.

DETAILED DESCRIPTION

Figure 1:
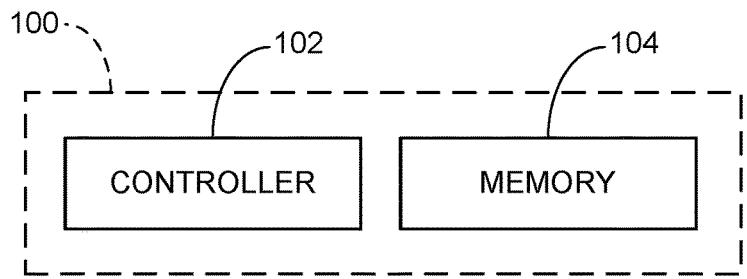
FIG. 1 provides a functional block representation of a data storage device in accordance with various embodiments.

Without limitation, the various embodiments disclosed herein are generally directed to managing data accesses to different die set portions a data storage system to provide optimized system time-to-ready after a power up initialization.

In data storage systems that utilize multiple different die sets, an operational goal is to provide isolation of media resources between host workloads. However, one down side of such isolation is that media work for a given die set can become very concentrated against limited resources, which results in operations having to wait for resources to become available. Although not limited, resources involved in a media operation can be a semiconductor memory die, bus interface connecting a controller to the semiconductor memory die, buffer memory, error correction encoders and decoders, data structures used by hardware and/or firmware to communicate requests/status, electrical power, and power loss protection budget.

The limited availability of these, and other, resources cause "backpressure" in terms of both the flow of user data between host and media, such as NAND flash memory, and in terms of control flow (commands and status). Such backpressure causes over utilization of one die set that can delay the processing of commands to other die sets, which results in underutilization of the resources of the data storage system as a whole. Accordingly, data storage systems can be optimized in accordance with various embodiments to provide increased data rate, improved consistency in command completion times and throughput, and more consistent performance between die sets.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into die sets, which may correspond with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a top-level map and a number of journal updates to the general map, although other forms can be used.

The top-level map provides an overall map structure that can be accessed by a controller to service a received host access command (e.g., a write command, a read command, etc). The top-level map may take the form of a two-tier map, where a first tier of the map maintains the locations of map pages and a second tier of the map provides a flash transition layer (FTL) to provide association of logical addresses of the data blocks to physical addresses at which the blocks are stored. Other forms of maps can be used including single tier maps and three-or-more tier maps, but each generally provides a forward map structure in which pointers may be used to point to each successive block until the most current version is located.

A reverse directory can be written to the various GCUs and provides local data identifying, by logical address, which data blocks are stored in the associated GCU. The reverse directory, also sometimes referred to as a footer, thus provides a physical to logical association for the locally stored blocks. As with the top-level map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a semiconductor memory module. A number of channels, or lanes, are provided to enable communications between the controller and dies within the flash memory. The capacity can be divided among a number of die sets, with each die set controlled by a different owner/user. Based on the configuration, such as an app container or virtual machine environment, many different users can be concurrently accessing a given SSD and providing data access.) commands, such as data reads and data writes, that prompt background operations to be conducted.

As data access commands are issued by a host, an issue arises when the commands cannot be immediately serviced because a given resource, such as a channel, memory die, die set, or electrical power, is currently being used to service a different data storage system operation. Some embodiments avoid data access command servicing difficulties by departing from input data access command order to avoid resource limitations/contentions among system resources. By monitoring the various work loads on the various die sets of a data storage system and performing data access commands and/or background operations out of order based on real-time available system resources, data storage system performance can be optimized, particularly during power up initialization where system resources are often depleted.

However, reordering or otherwise executing data access commands out of input sequence can create performance issues, such as write/read collision. In some embodiments, a collision list can be maintained in which data access commands are placed when they cannot be serviced at the time at which the data access command became due for execution in a queue. A collision list, in various embodiments, has first priority and is repetitively checked to ensure the commands are not forgotten.

These and other features may be practiced in a variety of different data storage devices, but various embodiments optimize the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices, network server, network node, or remote controller.

Figure 2:
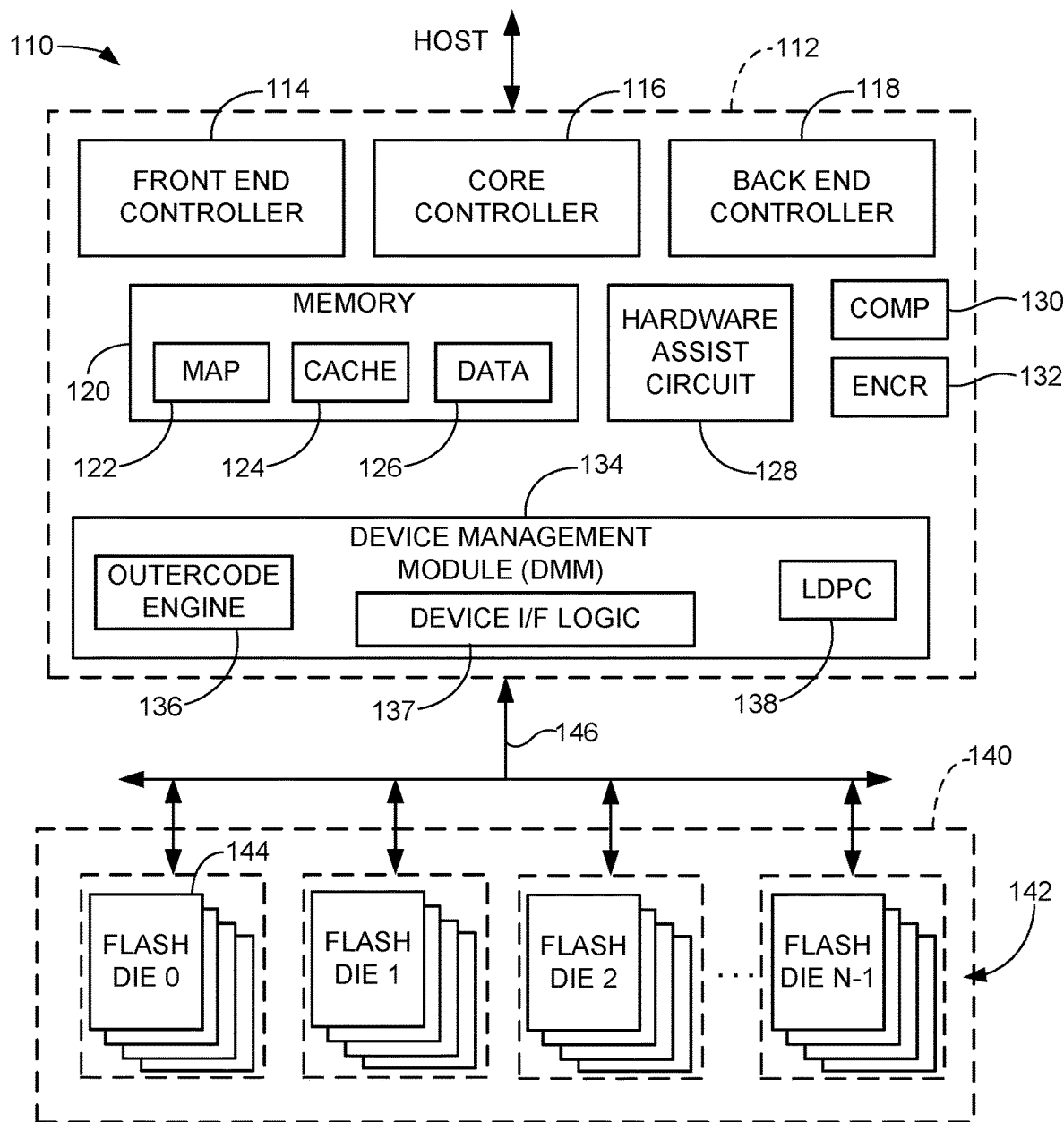
FIG. 2 shows aspects of the device of FIG. 1 characterized as a solid state drive (SSD) in accordance with some embodiments.

FIG. 2 displays an example data storage device 110 generally corresponding to the device 100 in FIG. 1. The device 110 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate die sets for use in the storage of data. Each die set may form a portion of a Namespace that may span multiple SSDs or be contained within a single SSD.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via one or more channels (lanes) 146.

Figure 3:
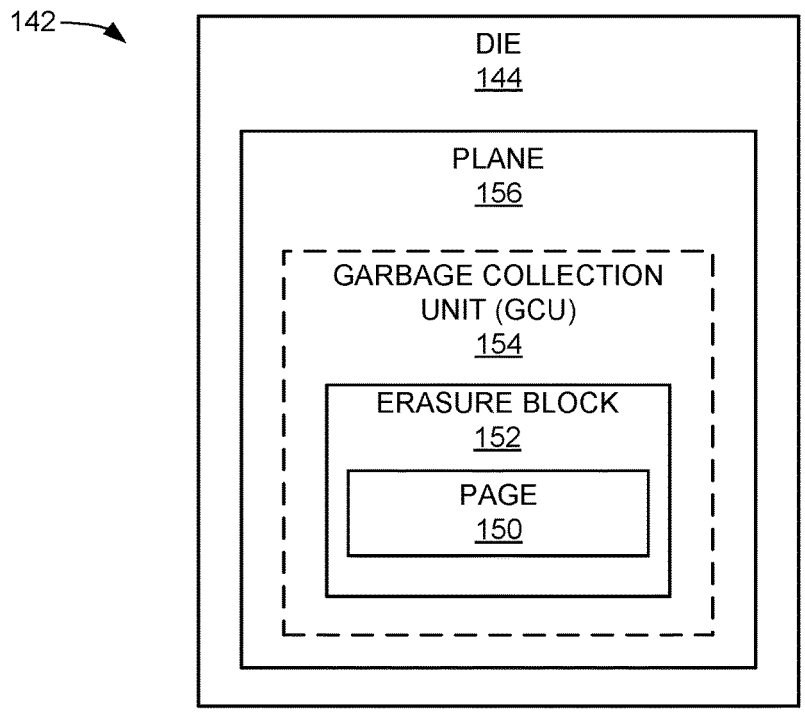
FIG. 3 is an arrangement of the flash memory of FIG. 2 in some embodiments.

FIG. 3 shows an arrangement of the various flash memory dies 144 in the flash memory 142 of FIG. 2 in some embodiments. Other configurations can be used. The smallest unit of memory that can be accessed at a time is referred to as a page 150. A page may be formed using a number of flash memory cells that share a common word line. The storage size of a page can vary; current generation flash memory pages can store, in some cases, 16 KB (16,384 bytes) of user data.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies.

Each die 144 may include a plurality of planes 156. Examples include two planes per die, four planes per die, etc. although other arrangements can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
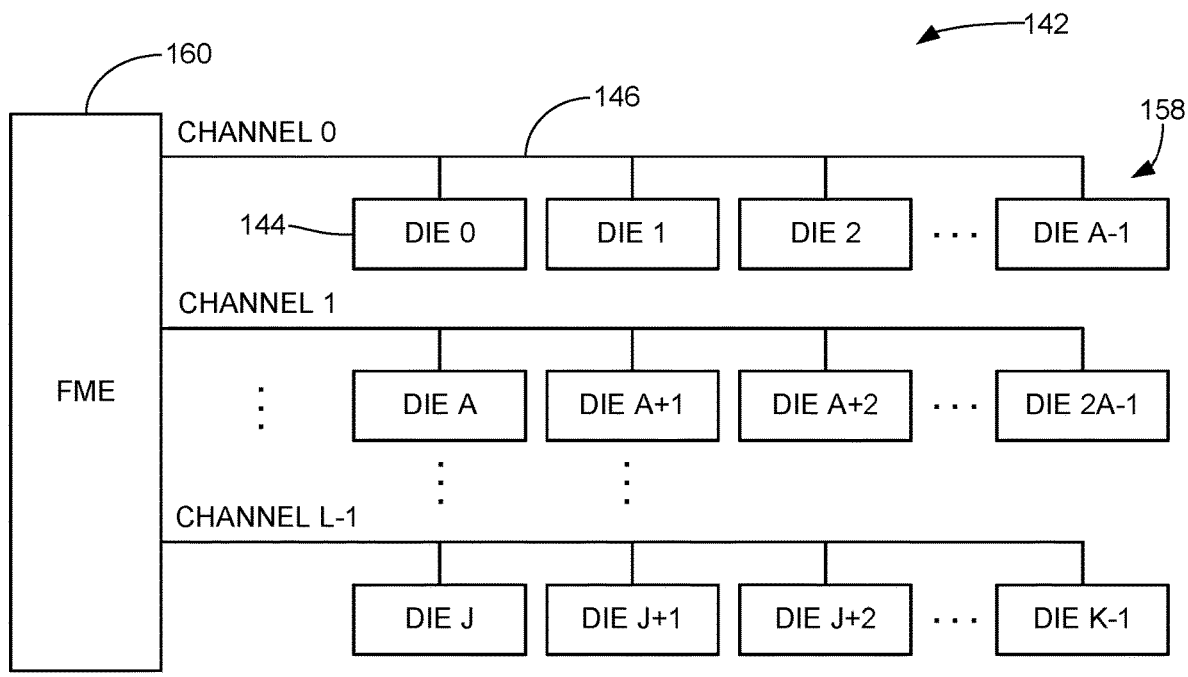
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 160 of the flash memory module 142 controls each of the channels 146 to transfer data to and from the dies 144.

In some embodiments, the various dies are arranged into one or more die sets. A die set represents a portion of the storage capacity of the SSD that is allocated for use by a particular host (user/owner). die sets are usually established with a granularity at the die level, so that some percentage of the total available dies 144 will be allocated for incorporation into a given die set.

A first example die set is denoted at 162 in FIG. 4. This first set 162 uses a single die 144 from each of the different channels 146. This arrangement provides fast performance during the servicing of data transfer commands for the set since all eight channels 146 are used to transfer the associated data. A limitation with this approach is that if the set 162 is being serviced, no other die sets can be serviced during that time interval. While the set 162 only uses a single die from each channel, the set could also be configured to use multiple dies from each channel, such as 16 dies/channel, 32 dies/channel, etc.

A second example die set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple die sets at the same time, provided the sets do not share the same (e.g., an overlapping) channel 146.

Figure 5:
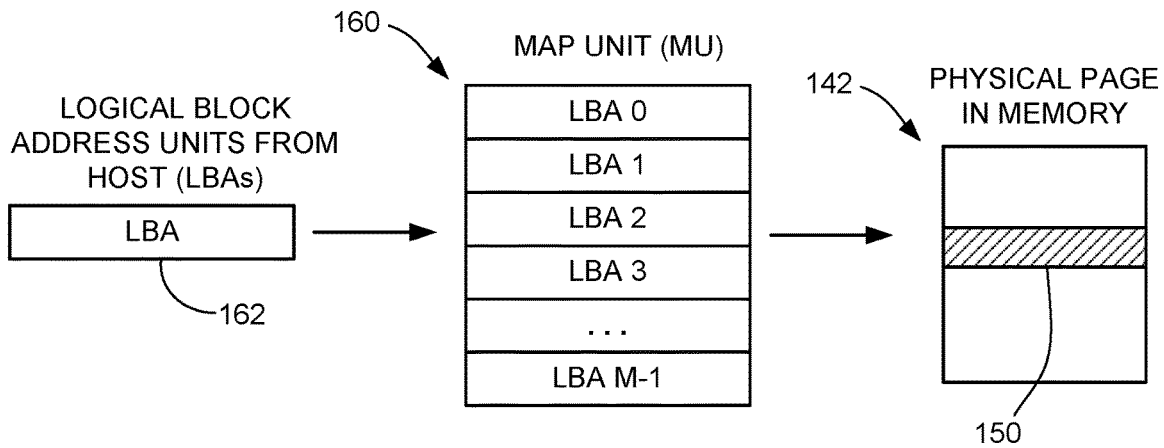
FIG. 5 represents a map unit (MU) as a data arrangement stored to the flash memory of FIG. 2.

FIG. 5 illustrates a manner in which data may be stored to the flash memory module 142. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024 B (1 KB), etc., and the MUs 170 may have a second nominal size, such as 4096 B (4 KB), etc. The application of data compression may cause each MU to have a smaller size in terms of actual bits written to the flash memory 142.

The MUs 170 are arranged into the aforementioned pages 150 (FIG. 3) which are written to the memory 142. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 170) to enable the SSD 110 to locate the physical location of existing data. For example, during the servicing of a read command it is generally necessary to locate the physical address within the flash memory 144 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
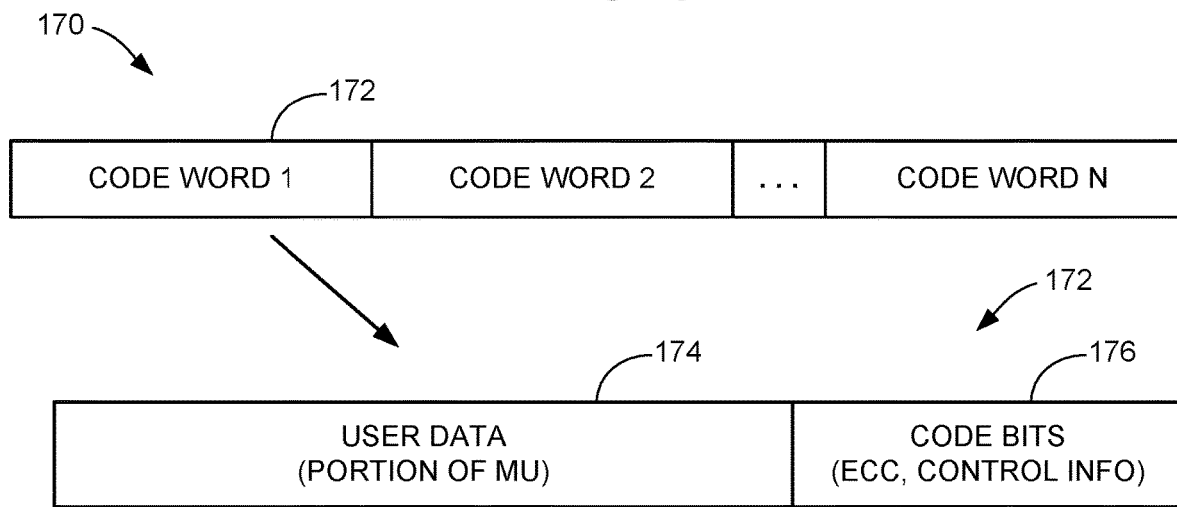
FIG. 6 shows a functional block diagram for a GCU management circuit of the SSD in accordance with some embodiments.

FIG. 6 shows a functional block diagram for a GCU management circuit 180 of the SSD 110 in accordance with some embodiments. The circuit 180 may form a portion of the controller 112 and may be realized using hardware circuitry and/or one or more programmable processor circuits with associated firmware in memory. The circuit 180 includes the use of a forward map 182 and a reverse directory 184. As noted above, the forward map and reverse directory are metadata data structures that describe the locations of the data blocks in the flash memory 142. During the servicing of host data transfer operations, as well as other operations, the respective portions of these data structures are located in the flash memory or other non-volatile memory location and copied to local memory 120 (see e.g., FIG. 2).

The forward map 182 provides a flash transition layer (FTL) to generally provide a correlation between the logical addresses of various blocks (e.g., MUAs) and the physical addresses at which the various blocks are stored (e.g., die set, die, plane, GCU, EB, page, bit offset, etc.). The contents of the forward map 182 may be stored in specially configured and designated GCUs in each die set.

The reverse directory 184 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 180 further includes a map integrity control circuit 186. As explained below, this control circuit 186 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 188. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 186 find a mismatch between the forward map 182 and the reverse directory 184 for a given GCU, the control circuit 186 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 182 indicates that there should be some number X valid blocks in the selected GCU, such as 12 valid blocks, but the reverse directory 184 indicates that there are only Y valid blocks, such as 11 valid blocks, and the 11 valid blocks indicated by the reverse directory 184 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 190 may be formed as a data structure in memory of GCUs that have been found to require further evaluation. In this way, the GCUs can be evaluated later at an appropriate time for resolution, after which the corrected GCUs can be placed on the verified list in the TOVG 188.

It will be noted that the foregoing operation of the control circuit 186 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 180 to include a garbage collection scheduler circuit 192. This circuit 192 generally operates once it is appropriate to consider performing a garbage collection operation, at which point the circuit 192 selects from among the available verified GCUs from the table 188. In some cases, the circuit 192 may generate a time of completion estimate to complete the garbage collection operation based on the size of the GCU, the amount of data to be relocated, etc.

As will be appreciated, a garbage collection operation can include accessing the forward map and/or reverse directory 182, 184 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
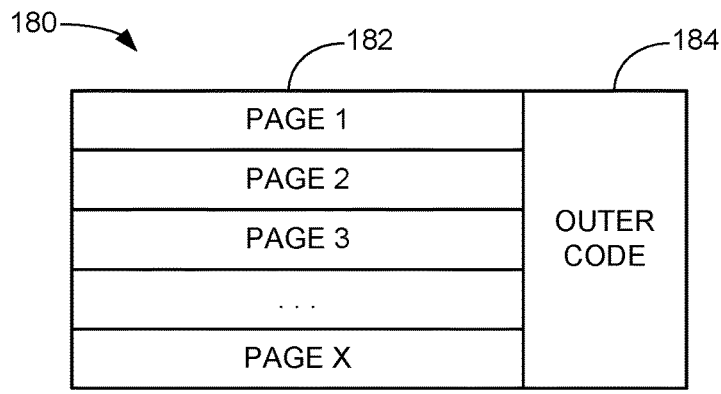
FIG. 7 illustrates an arrangement of various GCUs and corresponding tables of verified GCUs (TOVGs) for a number of different die sets in some embodiments.

FIG. 7 shows a number of die sets 200 that may be arranged across the SSD 110 in some embodiments. Each set 200 may have the same nominal data storage capacity (e.g., the same number of allocated dies, etc.), or each may have a different storage capacity. The storage capacity of each die set 200 is arranged into a number of GCUs 154 as shown. In addition, a separate TOVG (table of verified GCUs) 188 may be maintained by and in each die set 200 to show the status of the respective GCUs. From this, each time that it becomes desirable to schedule a garbage collection operation, such as to free up new available memory for a given set, the table 188 can be consulted to select a GCU that, with a high degree of probability, can be subjected to an efficient garbage collection operation without any unexpected delays due to mismatches in the metadata (forward map and reverse directory).

Figure 8:
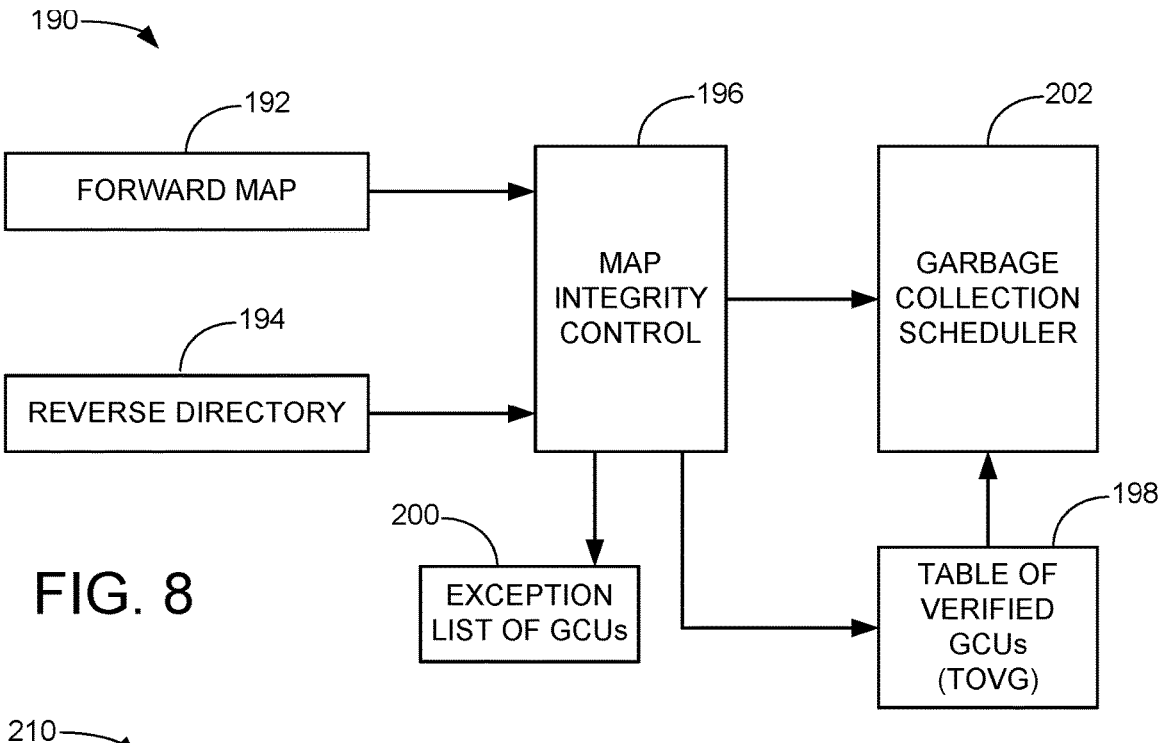
FIG. 8 displays a functional block diagram for a GCU management circuit of the SSD in accordance with some embodiments.

FIG. 8 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 9:
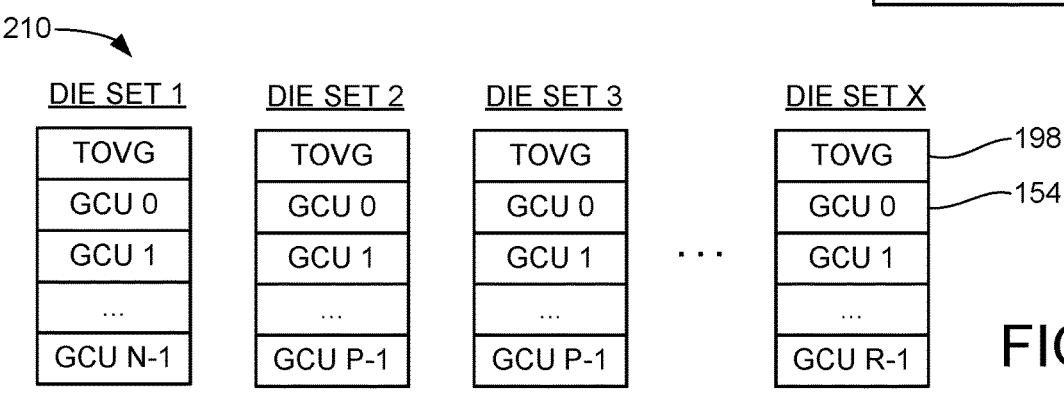
FIG. 9 depicts an arrangement of various GCUs and corresponding tables of verified GCUs (TOVGs) for a number of different die sets in some embodiments.

FIG. 9 shows a number of die sets 210 that may be arranged across the SSD 110 in some embodiments. Each set 210 may have the same nominal data storage capacity (e.g., the same number of allocated dies, etc.), or each may have a different storage capacity. The storage capacity of each die set 210 is arranged into a number of GCUs 154 as shown. In addition, a separate TOVG (table of verified GCUs) 198 may be maintained by and in each die set 210 to show the status of the respective GCUs. From this, each time that it becomes desirable to schedule a garbage collection operation, such as to free up new available memory for a given set, the table 198 can be consulted to select a GCU that, with a high degree of probability, can be subjected to an efficient garbage collection operation without any unexpected delays due to mismatches in the metadata (forward map and reverse directory).

Figure 10:
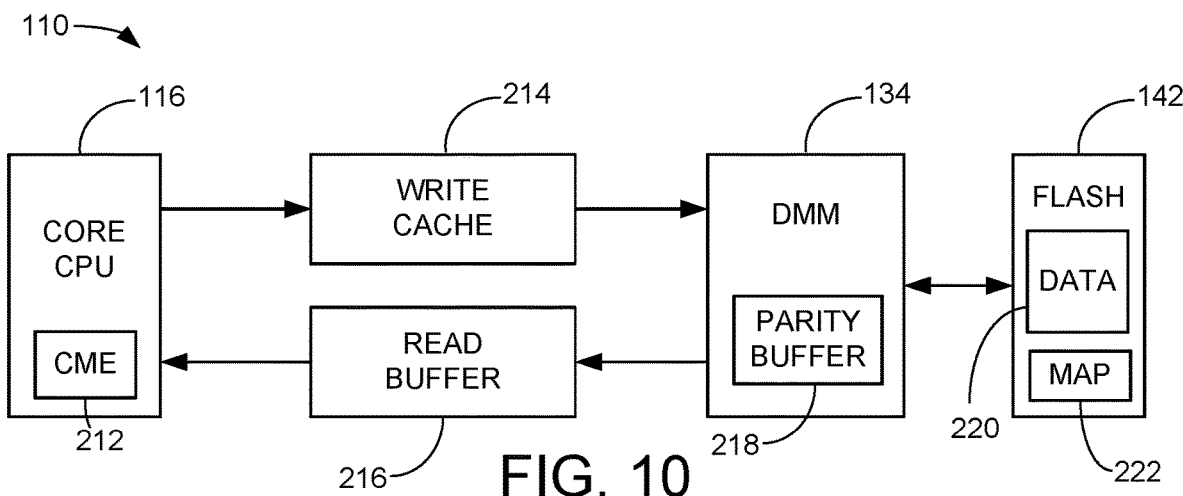
FIG. 10 illustrates an example data set that can be written to the data storage device of FIG. 1 in accordance with assorted embodiments.

FIG. 10 shows a functional block representation of additional aspects of the SSD 110. The core CPU 116 from FIG. 2 is shown in conjunction with a code management engine (CME) 212 that can be used to manage the generation of the respective code words and outer code parity values for both standard and non-standard parity data sets During write operations, input write data from the associated host are received and processed to form MUs 160 (FIG. 3) which are placed into a non-volatile write cache 214 which may be flash memory or other form(s) of non-volatile memory. The MUs are transferred to the DMM circuit 134 for writing to the flash memory 142 in the form of code words 172 as described above. During read operations, one or more pages of data are retrieved to a volatile read buffer 216 for processing prior to transfer to the host.

The CME 212 determines the appropriate inner and outer code rates for the data generated and stored to memory. In some embodiments, the DMM circuit 134 may generate both the inner and outer codes. In other embodiments, the DMM circuit 134 generates the inner codes (see e.g., LDPC circuit 146 in FIG. 2) and the core CPU 116 generates the outer code words. In still other embodiments, the same processor/controller circuit generates both forms of code words. Other arrangements can be used as well. The CME 212 establishes appropriate code rates for both types of code words.

During generation of the outer codes, a parity buffer 218 may be used to successively XOR each payload being written during each pass through the dies. Both payload data 220 and map data 222 will be stored to flash 142.

Figure 11:
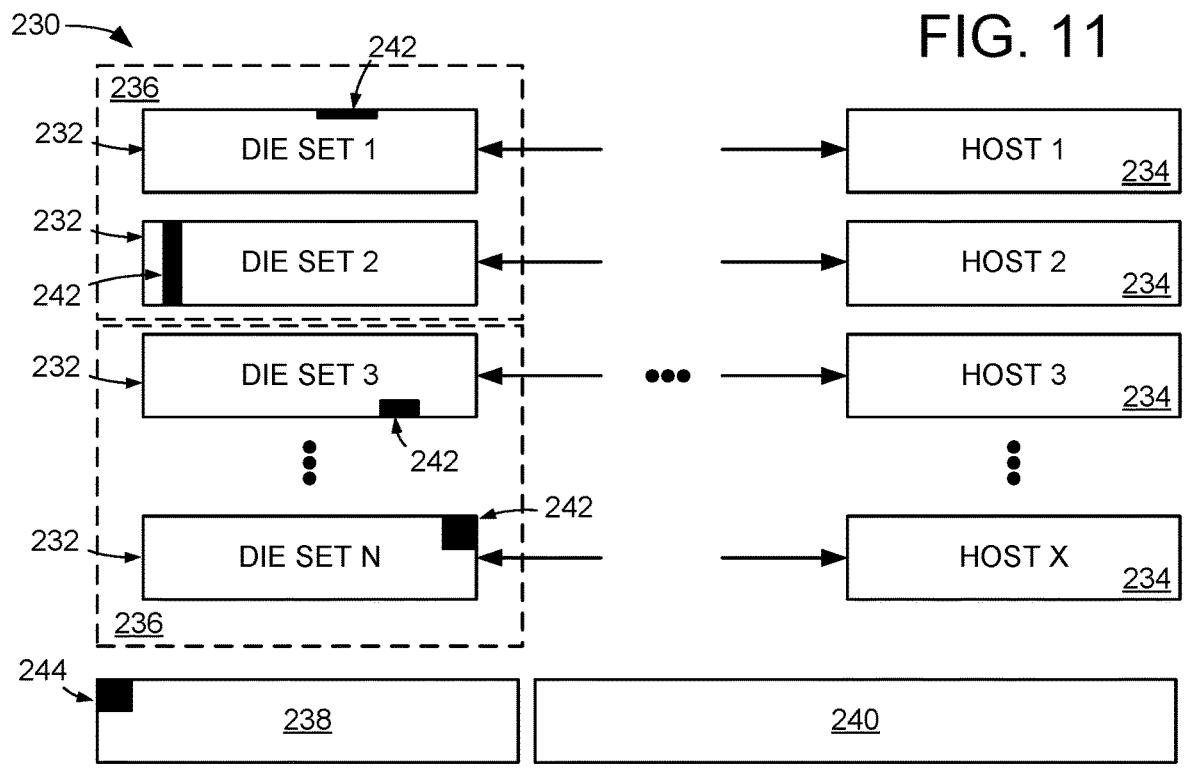
FIG. 11 conveys a block representation of an example data storage system in which various embodiments may be practiced.

FIG. 11 depicts portions of an example data storage system 230 in which various embodiments can be practiced. A number (N) of die sets 232 are respectively connected to a number (X) of remote hosts 234 via a distributed network. It is noted that the die sets 232 can be logical divisions of one or more data storage devices/memory die, as generally shown by segmented regions 236.

A local buffer 238 and local controller 240 are available to the data storage system 230 to carry out the assorted data access requested by the hosts 234 and corresponding background operations triggered by the execution of those data access requests. One such background operation can be the maintenance of a die set map structure that corresponds with a single die set 232 or a plurality of different die sets. As shown, a die set 232 can have a die set specific map 242 that compiles the logical and physical addresses of the various host data stored in the die set 242 in which the map 242 is stored along with any journal updates that pertains to data access updates to the map 242.

It is contemplated that a die set 232 has numerous different journals generated and stored by the local controller 240 as needed. At some time, the controller 240 can direct garbage collection activity of the various maps 242 and journals of a die set 232 where the data update information of the journals is incorporated into the die set map 242 prior to the journals being erased. An overall system top-level map 244 can be temporarily, or permanently, stored in any portion of a data storage system 230, such as in the buffer 238 as illustrated, to store mapping information pertaining to more than one different die set.

It is noted that using separate map structures for the respective die sets 232 can consume more initial system resources, such as processing power, time, and electrical power, than if journals and top-level map 244 of system 230 were stored in a centralized location. The concurrent utilization of high volumes of system resources, such as loading separate die set specific maps and journals in parallel, can jeopardize the power up time-to-ready for a data storage system by monopolizing system resources. On the other hand, a centralized mapping structure, such as using a single top-level map 244, can also jeopardize a system's time-to-ready by increasing the risk for data access command conflicts. Hence, utilization of different mapping schemes cannot readily overcome difficulties associated with long time-to-ready system power up initialization.

Figure 12:
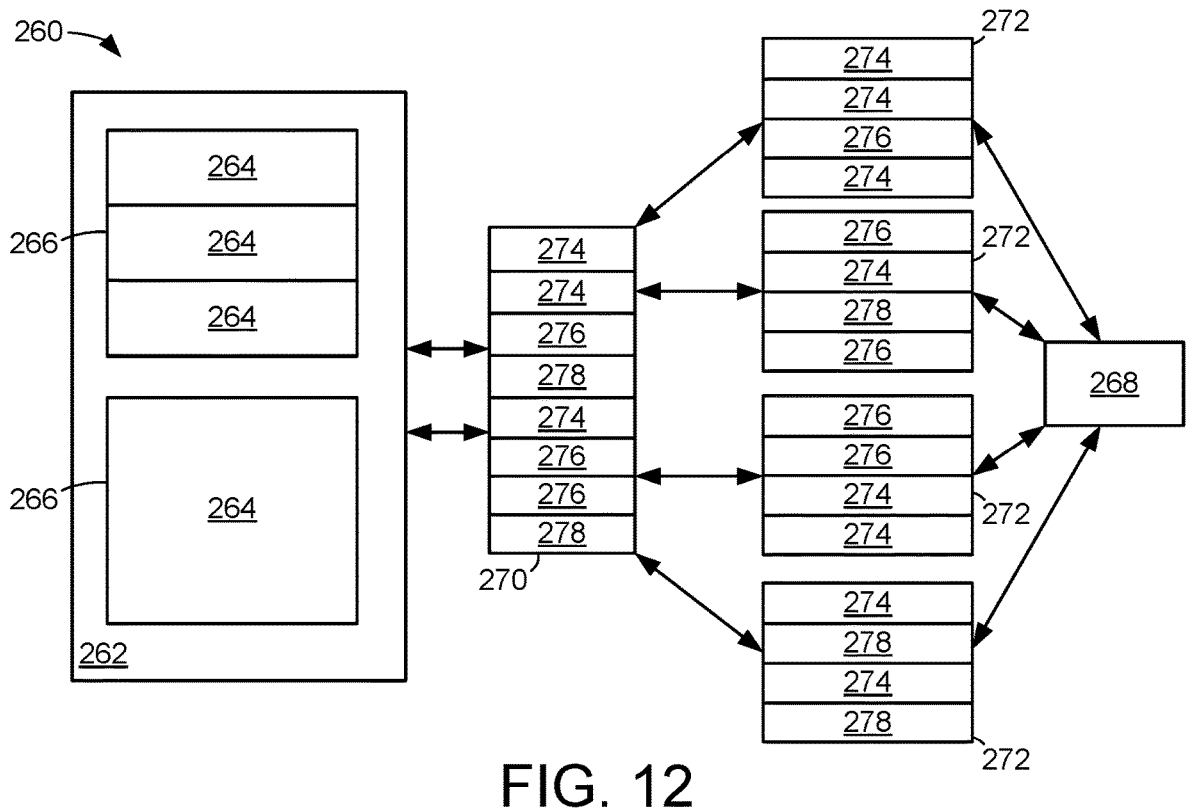
FIG. 12 represents portions of an example data storage system configured in accordance with various embodiments.

FIG. 12 illustrates a block representation of portions of an example data storage system 260 in which a data storage device 262 has numerous logical die sets 264 arranged in semiconductor memory dice 266. The die sets 264 can experience degraded performance when commands from one or more hosts 268 conflict in what can be characterized as a collision. That is, the flow of user-generated data and associated system data, like map, journal, and metadata, from the host 268 to a die set 264 through a channel queue 270 and die set specific queues 272 can demand system resources that are being used elsewhere, which delays execution of commands, degrades data throughput, and slows system initialization during power on startup.

Occupied system resources and the delay of data access command execution is particularly stressed during deterministic window intervals where data access performance consistency is emphasized. For instance, a first die set 264 can be in a non-deterministic window interval and is occupying system resources by executing data reads 274, data writes 276, and/or background operations 278 while a second die set 266 is in a deterministic window interval. It is noted that a data storage system 260 can comprise any number of queues 270/272 without limitation, but various embodiments arrange the channel queue 270 to execute commands 274/276/278 in the order in which they populate the queue 270 from the set specific queues 272 that have commands 274/276/278 addressed to a single die set 264.

As a result of the potential shuffling of data access commands 274/276/278 from different die set specific queues 272 in the channel queue 270, deterministic window command execution consistency is jeopardized. Although it is contemplated that the channel queue 270 commands can be rearranged and/or executed out of order, such activity can occupy valuable processing, power, and time system resources. Hence, embodiments that evaluate system resources and customize the population of the channel queue 270 can optimize system data access performance, system time-to-ready, and deterministic window interval consistency.

Figure 13:
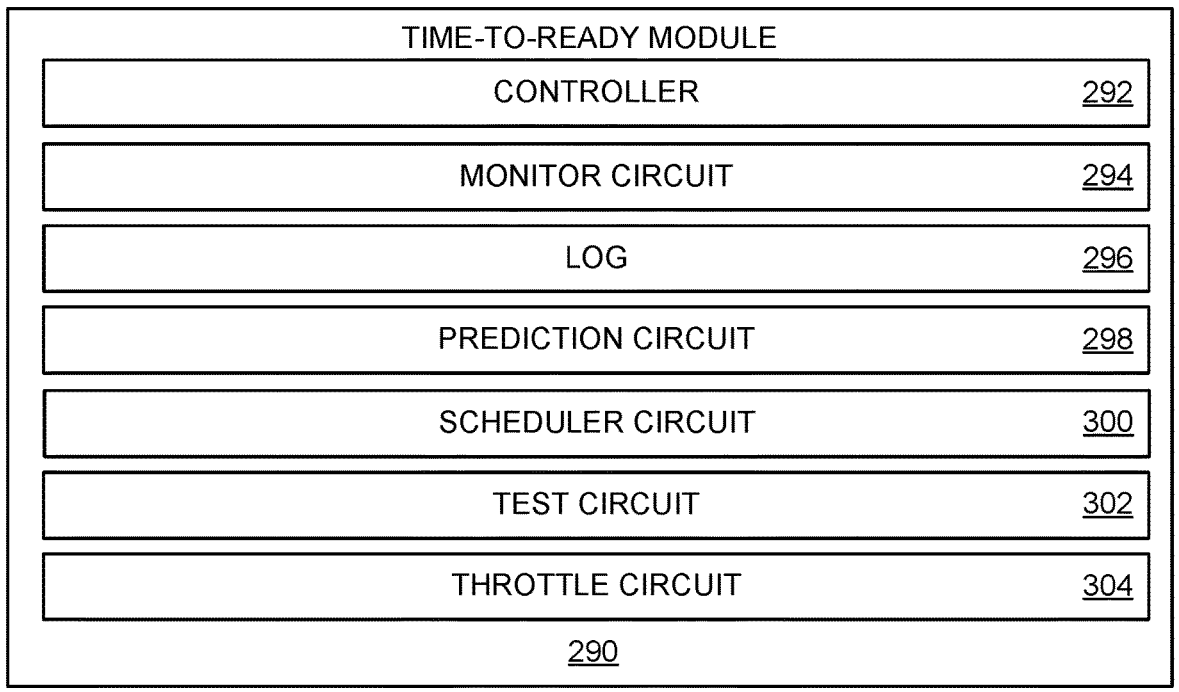
FIG. 13 displays an example time-to-ready module that can be utilized in various embodiments.

FIG. 13 represents an example time-to-ready module 290 configured and operated in accordance with some embodiments to balance data access performance across different die sets and hosts. The time-to-ready module 290 can intelligently utilize constituent circuitry to track performance metrics of executed tasks between multiple different die sets and hosts in a distributed data storage system to reactively and proactively optimize data access requests to concurrently balance data access performance across the system.

The time-to-ready module 290 can utilize a controller 292, such as a microprocessor or programmable circuitry generally represented by controller 240 of FIG. 11, to direct activity of various circuitry. For instance, real-time data storage system performance metrics, such as latency, error rate, overall time to service a host request, number of background operations triggered, overall queue input-output frequency, and deterministic window interval activation, can be measured and/or detected with a monitor circuit 294. The monitor circuit 294 may maintain a log 296 of detected die set and host activity in local memory in order to allow a prediction circuit 298 of the module 290 to identify patterns and consequential data access tasks.

The prediction circuit 298 can utilize model data from other data storage systems and/or past logged activity from the present system to predict what tasks are likely to arrive in a die set queue as well as how long each task will take to execute in various die sets of a distributed data storage system in view of the present system conditions. The prediction circuit 298 can employ machine learning to improve the accuracy of forecasted background operations, read accesses, and write accessed, as well as the performance of those forecasted tasks, based on real-time tracked executions from the monitor circuit 294. It is contemplated the prediction circuit 298 can generate an accuracy value for forecasted tasks, and/or forecasted performance, and only provide those predictions that are above a predetermined accuracy threshold, such as 90% confidence.

The ability to predict future tasks and their respective execution times to numerous different die sets with the prediction circuit 298 allows the quality of time-to-ready module 290 to organize existing tasks so that future tasks do not inhibit or degrade consistent read access latency during deterministic window intervals. Knowledge of past executed tasks to a die set attained with the monitor circuit 294 and the accurate prediction of future pending tasks and their execution times allows a scheduler circuit 300 of the module 290 to customize existing queued tasks to at least one die set to optimize future data storage system operation. Queue customization is not limited to a particular action, but is contemplated that the scheduler circuit 300 correlates certain tasks to available system processing bandwidth, prioritizes the longest tasks to execute, prioritizes the shortest tasks to execute, and/or generates background operations out-of-turn.

At any time, the time-to-ready module 290 can utilize a test circuit 302 to carry out one or more data access operations to at least one portion of any die set to collect operational data that can increase the accuracy and speed of the monitor 294 and prediction 298 circuits. That is, one or more test patterns of data reads and/or data writes can be conducted to one or more different die sets with the test circuit 300 to verify measurements by the monitor circuit 294, test for un-monitored performance characteristics, such as memory cell settling, write amplification, or environmental conditions, and measure the data access performance of less than all of a die set.

As a result of real-time measurements, predictions, or tests, the execution performance of queued tasks may be higher, or lower, than expected. A throttle circuit 304 can resolve such issues by altering a queued task to manipulate the task's execution performance. For instance, the throttle circuit 304 may split a task into two separately executed tasks, utilize less than all available system resources to execute a task, or deliberately delay a task during execution to control when a task completes. Such control of queued task execution performance can be particularly emphasized during DW intervals. Accordingly, the time-to-ready module 290 can employ the constituent circuits to choose and/or manipulate pending die set tasks to ensure consistent data access performance for each die set and host of a data storage system throughout the guaranteed interval time period.

Some embodiments contemplate a single time-to-ready module 290 handling a variety of different die sets, queues, and host commands while other embodiments may use multiple different time-to-ready modules 290 in a data storage system. Regardless of the number of time-to-ready modules 290, or constituent circuitry, a data storage system controller 292 may compile measured and/or predicted system information together in order to generate a strategy for establishing and maintaining balanced data access performance for each die set and host during NDW intervals, prioritizing data accesses during DW intervals, and executing data accesses specific to decreasing a data storage system's time-to-ready.

A means for optimizing data access performance involves identifying data access collisions that can delay die set readiness and/or degrade command execution performance. A collision can be characterized as a detected, or predicted, data access error, fault, or other circumstance where data storage system resources are being used in a manner that degrades data access performance and/or system time-to-ready. Accordingly, the time-to-ready module 290 can generate, populate, and maintain one or more collision lists where actual, and/or predicted, data access collisions are organized.

Figure 14:
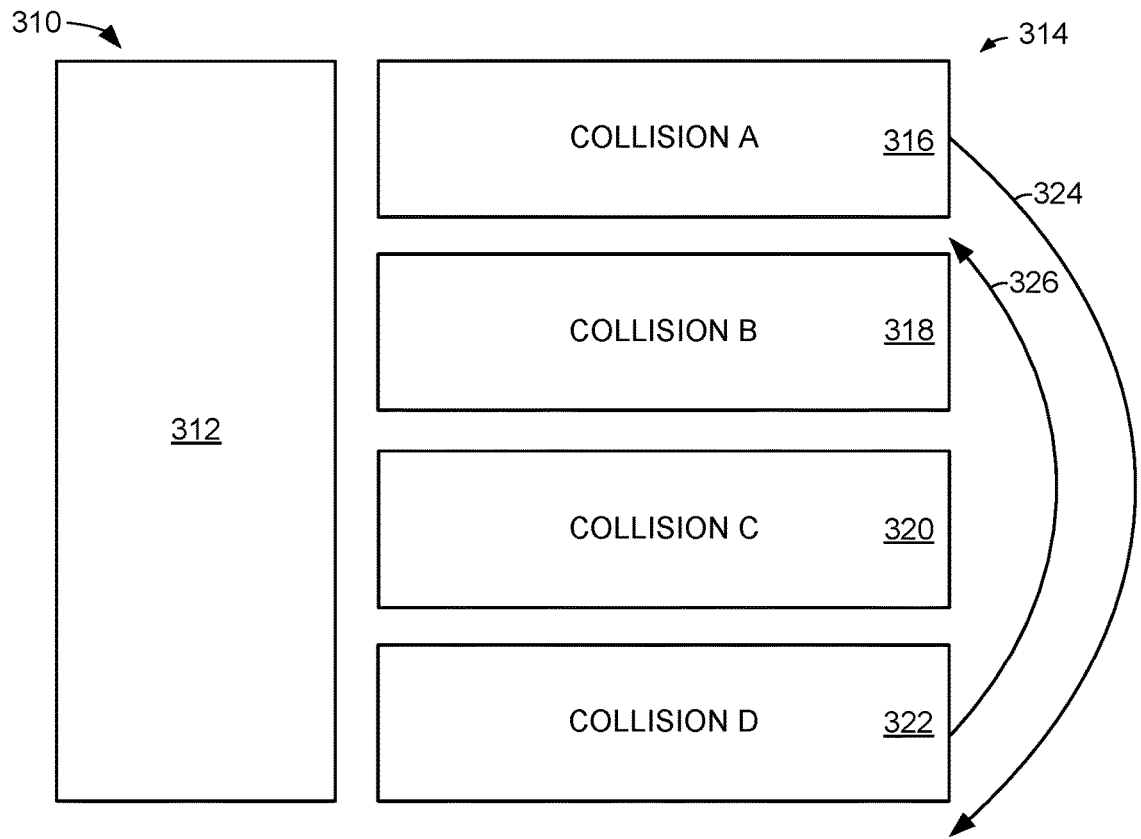
FIG. 14 shows a block representation of portions of an example data storage system arranged and operated in accordance with some embodiments.

FIG. 14 illustrates an example portion of a data storage system 310 where a time-to-ready module 312 directs a collision list 314 in accordance with various embodiments. Any number of data access collisions can be detected and/or predicted to populate the list 314, but four separate collisions A 316, B 318, C 320, and D 322 are shown as a non-limiting example.

It is contemplated that the various collisions 316/318/320/322 can be data access commands that cannot be completed or have been proactively segregated from a channel queue to avoid a collision with data access command(s) that have been assigned greater priority by the time-to-ready module 312. It is noted that the list 314 can be arranged so that the topmost collision, such as collision A 316 in FIG. 14, is next to be executed when system resources allow.

The maintenance of the collision list 314 allows the time-to-ready module 312 to ensure host addressed data access commands are not lost after an actual, or predicted, execution collision. The list 314 may be stored anywhere in a data storage system 310, such as non-volatile or volatile memory, which allows for fast reconfiguration of the list 314 with minimal power and time resource expense. As such, the time-to-ready module 312 can move different data access commands associated with a collision 316/318/320/322 within the list 314 to adapt to changing data storage system 310 conditions.

For example, when populated, collision A 316 may have been prioritized by the time-to-ready module 312 in response to queued commands for various die sets and subsequent system resource and/or queued command changes cause collision A 316 to be demoted in the list 314, as shown by arrow 324. As another non-limiting example, changing data accesses and/or system resources can prompt the time-to-ready module to promote collisions within the list 314, such as collision D 322 as conveyed by arrow 326. The ability to alter the execution organization of the list 314 allows the time-to-ready module 312 to ensure execution of all system data access commands without degrading data access performance and while decreasing a system's time-to-ready during power up initialization.

Figure 15:
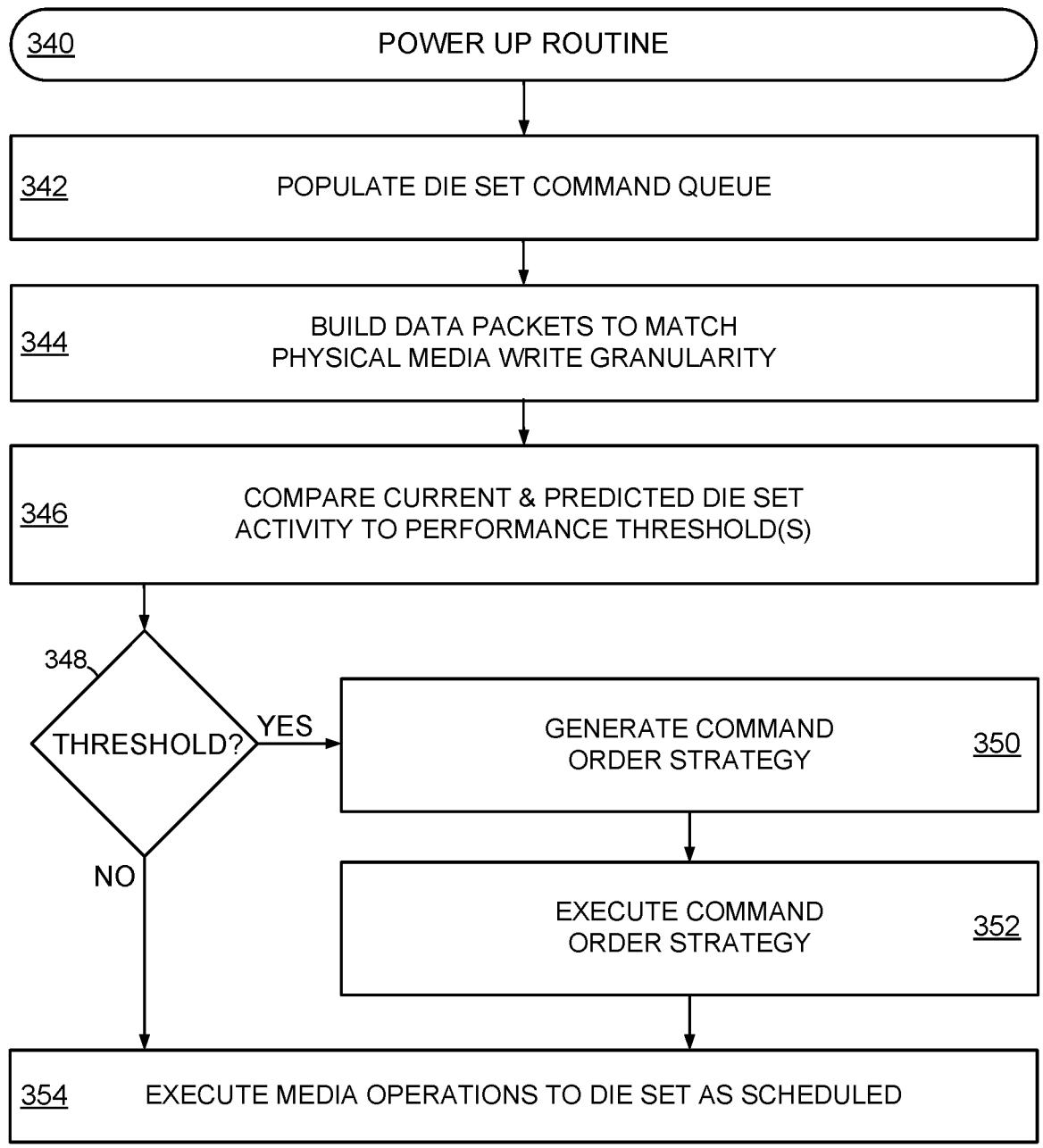
FIG. 15 is an example power up routine that can be executed by the respective embodiments of FIGS. 1-14.

FIG. 15 is a flowchart of an example power up routine 340 that can be executed by a data storage system in accordance with the assorted embodiments of FIGS. 1-14. The establishment of a distributed data network with a plurality of data storage devices and logical die sets connected to a plurality of remote hosts allows step 342 to populate at least one die set specific data access command queue, such as queue 272 of FIG. 12. Step 342 may also involve populate a channel queue, such as queue 270 of FIG. 12, as an aggregation of data access commands from various die set specific queues.

In some embodiments, a channel queue is not populated in step 342 and, instead, step 344 builds data packets from the die set specific commands of varying physical sizes to match a physical media write granularity determined by the system resources and configuration of the non-volatile memory, either semiconductor or rotating magnetic type data storage. Next, step 346 compares current and/or predicted die set activity to one or more performance thresholds based on the execution of data access commands involving the data packets built in step 344. A threshold is not limited to a particular metric, but can be a predicted execution time of a command, time-to-ready for a die set or data storage device, deterministic window command execution consistency, or system resource expense, such as an electrical power or processing resource expense.

Decision 348 evaluates the performance threshold comparison from step 346 and generates a command order strategy in step 350 if one or more thresholds are exceeded. A command order strategy of step 350 can be created by a time-to-ready module and subsequently executed in step 352. Such a command order strategy can involve the generation and maintenance of a collision list, such as list 314 of FIG. 14, and can customize the population of a channel queue from multiple different die set specific queues to avoid and/or mitigate the expense of data storage system resources in a manner that degrades data access performance, consistency, and/or system time-to-ready. For instance, a time-to-ready module can populate or reorganize a channel queue with data access commands as part of a command order strategy in an order that is dissimilar from the order in which the respective commands were generated by remote host(s) in an effort to bring die set(s) to a ready state after an electrical power interrupt quicker than if the commands were executed in the order in which they were generated.

As another non-limiting example of a command order strategy executed in step 352, a time-to-ready module can respond to predicted collisions of system resources by delaying one or more data access commands from entry into a channel queue so that the channel queue is populated with data access commands customized to a specific system priority, such as reduced time-to-ready, consistent data access execution in a deterministic window interval, or peak data access performance during a non-deterministic window interval. At the conclusion of a command order strategy, or in the event no threshold was breached in decision 348, step 354 proceeds to execute data access commands and media operations to one or more die sets as scheduled in an order corresponding to when the commands were generated by remote hosts.

Through the various embodiments of the present disclosure, data access commands can be managed intelligently to optimize data storage system operation. After an electrical power interrupt for a non-volatile memory where a logical die set is resident, data access commands, such as background operations, that are necessary to bring the die set to an operational state can be prioritized to reduce the time the die set takes to be ready ("time-to-ready). The detection and/or prediction of system resource collisions allows a time-to-ready module to customize data access command population of queues to further optimize data storage system performance in various situations, such as deterministic window intervals.

What is claimed is:

1. A method comprising:
   dividing a semiconductor memory into a plurality of die sets;
   populating a die set queue with data access commands addressed by a remote host, the data access commands having a first order;
   generating a command order strategy with a time-to-ready module, the command order strategy organizing the data access commands to a second order, the second order generated to satisfy a deterministic window to a first die set of the plurality of die sets;
   executing the command order strategy as directed by the time-to-ready module to populate a channel queue; and
   executing the data access commands of the channel queue in the second order.

2. The method of claim 1, wherein each die set of the plurality of die sets has a separate die set queue.

3. The method of claim 1, wherein the first order corresponds to when a data access command was generated.

4. The method of claim 1, wherein the channel queue is fed data access commands from the die set queue.

5. The method of claim 1, wherein the time-to-ready module comprises a local controller.

6. The method of claim 1, wherein the time-to-ready module comprises a monitor circuit that detects real-time performance metrics associated with execution of the data access commands to the plurality of die sets.

7. The method of claim 1, wherein the time-to-ready module comprises a scheduler circuit that alters the first order to the second order.

8. The method of claim 1, wherein the time-to-ready module comprises a test circuit that evaluates the command order strategy prior to execution.

9. The method of claim 1, wherein the time-to-ready module comprises a throttle circuit that proactively decreases a data access performance for at least one die set of the plurality of die sets as part of the command order strategy.

10. A method comprising:
dividing a semiconductor memory into a plurality of die sets;
populating a die set queue with data access commands addressed by a remote host, the data access commands having a first order;
experiencing an electrical power interruption that disrupts operation of at least one die set of the plurality of die sets;
generating a command order strategy with a time-to-ready module, the command order strategy organizing the data access commands to a second order, the second order generated to satisfy a deterministic window to a first die set of the plurality of die sets;
executing the command order strategy as directed by the time-to-ready module to populate a channel queue; and
executing the data access commands of the channel queue in the second order.

11. The method of claim 10, wherein the time-to-ready module comprises a prediction circuit that forecasts a first system resource collision and a second system resource collision.

12. The method of claim 11, wherein the time-to-ready module maintains a collision list comprising at least the first and second system resource collisions.

13. The method of claim 12, wherein the time-to-ready module adapts to changing data access conditions by altering an order of the collision list.

14. The method of claim 10, wherein the command order strategy is created to decrease a time-to-ready for a die set of the plurality of die sets.

15. The method of claim 10, wherein the command order strategy is executed after a data access performance threshold is predicted to be breached.

16. The method of claim 15, wherein the data access performance threshold is a time-to-ready for a die set of the plurality of die sets.

17. The method of claim 15, wherein the data access performance threshold is an electrical power expense.

18. The method of claim 10, wherein the command order strategy is generated prior to the power interruption.

19. A system comprising a semiconductor memory divided into a plurality of die sets with at least one die set queue populated with data access commands addressed by a remote host and having a first order, a command order strategy generated by a time-to-ready module organizes the data access commands to a second order to satisfy a deterministic window to a first die set of the plurality of die sets, populates a channel queue with the data access command in the second order, and subsequently executes the data access commands in the second order.

20. The system of claim 19, wherein a controller is connected to the plurality of die sets and the time-to-ready module, the controller directing operation of the semiconductor memory.

* * * * *